United States Patent [19]

Booth

[11] Patent Number: 5,150,440
[45] Date of Patent: Sep. 22, 1992

[54] COUPLING OF OPTICAL FIBER TO OPTICAL WAVEGUIDE DEVICE

[75] Inventor: Bruce L. Booth, West Chester, Pa.

[73] Assignee: E. I. du Pont de Nemours and Company, Wilmington, Del.

[21] Appl. No.: 758,343

[22] Filed: Sep. 9, 1991

Related U.S. Application Data

[63] Continuation of Ser. No. 595,838, Oct. 11, 1990, abandoned.

[51] Int. Cl.⁵ .................................. G02B 6/30
[52] U.S. Cl. ........................................ 385/49
[58] Field of Search ............. 350/96.15, 96.17, 96.12

[56] References Cited

U.S. PATENT DOCUMENTS

| | | | |
|---|---|---|---|
| 4,609,252 | 9/1986 | Wong | 350/96.12 |
| 4,637,681 | 1/1987 | Yamamoto | 350/96.12 |
| 4,666,236 | 5/1987 | Mikami et al. | 350/96.15 |
| 4,883,743 | 11/1989 | Booth et al. | 430/321 |
| 5,015,059 | 5/1991 | Booth et al. | 350/96.17 |

FOREIGN PATENT DOCUMENTS

| | | |
|---|---|---|
| 0324492 | 7/1989 | European Pat. Off. . |
| 0324493 | 7/1989 | European Pat. Off. . |
| 0378226 | 7/1990 | European Pat. Off. . |

OTHER PUBLICATIONS

B. L. Booth, Photopolymer Material for Holography, Applied Optics, vol. 14, No. 3, Mar. 1975, pp. 593–601.

*Primary Examiner*—William L. Sikes
*Assistant Examiner*—Robert E. Wise

[57] ABSTRACT

A method of coupling an optical fiber with an optical waveguide device at an elevated temperature, through a symmetrical opening, in the presence of a liquid photohardenable composition, in order to extend the operability of the coupling over a wide range of temperatures.

29 Claims, 11 Drawing Sheets

COUPLING OF OPTICAL FIBER TO OPTICAL WAVEGUIDE DEVICE

This application is a continuation of U.S. application Ser. No. 07/595,838 filed Oct. 11, 1990, and now abandoned.

FIELD OF THE INVENTION

This invention relates to methods of coupling optical fibers to optical waveguide devices.

BACKGROUND OF THE INVENTION

In optical communication systems, messages are transmitted typically through optical fibers by carrier waves of optical frequencies that are generated by such sources as lasers or light emitting diodes. There is much current interest in such optical communication systems because they offer several advantages over other communication systems, such as having a greatly increased number of channels of communication and the ability to use other materials besides expensive copper cables for transmitting messages.

As the development of optical circuits proceeded, it became necessary to have optical waveguide devices which could couple, divide, switch and modulate the optical waves from one optical fiber to another, or from one waveguide device to another. For example devices see U.S. Pat. Nos. 3,689,264, 4,609,252 and 4,637,681.

Connecting optical devices to one another has traditionally been a problem. One method is to fuse or melt fibers or other configurations, for example, together so that light from one fiber or configuration can pass to the connected fibers or configurations. However, in such a fusion process it is difficult to control the extent of fusion and the exact geometry and reproducibility of the final structure.

SUMMARY OF THE INVENTION

The instant invention is directed to a method of coupling optical fibers to optical waveguide devices. More particularly, this invention pertains to a method of coupling an optical fiber having a first waveguide, a first end-point and a first center axis to an optical device having a second waveguide, a second end-point and a second center-axis, comprising the steps of:
  forming an opening of substantially square cross section, symmetrically in front of the second end-point in a direction substantially parallel to the direction of the second waveguide, the opening being adaptable to receive the optical fiber,
  introducing a liquid adhesive photopolymer in the opening
  inserting the fiber in the opening of the device so that the first and second end points are separated by a predetermined distance, and the first center axis substantially coincides with the second center axis;
  raising the temperature to a predetermined point; and
  photocuring the liquid adhesive photopolymer at the raised temperature, with the requirement that the raised temperature is high enough as to reduce temperature versus optical-throughput oscillations of the device at temperatures lower than the predetermined point.

Preferably, the optical waveguide device comprises a laminate of middle photopolymer layers containing the waveguide, and of external packaging photopolymer layers. Also preferably, the diameter of the optical fiber is adequately larger than the side of the square opening of the device, so that when the fiber and the optical waveguide device are coupled, self-centering of the first waveguide with the second waveguide is secured.

More preferably, the step of raising the temperature is conducted in two levels, a lower level adequate to prevent delamination of the layers during inserting the fiber into the opening, and a higher level adequate to reduce the temperature versus optical-throughput oscillations.

DESCRIPTION OF THE DRAWING

The reader's understanding of practical implementation of preferred embodiments of the invention will be enhanced by reference to the following detailed description taken in conjunction with perusal of the drawing figures, wherein.

DETAILED DESCRIPTION OF THE INVENTION

Figure 1:
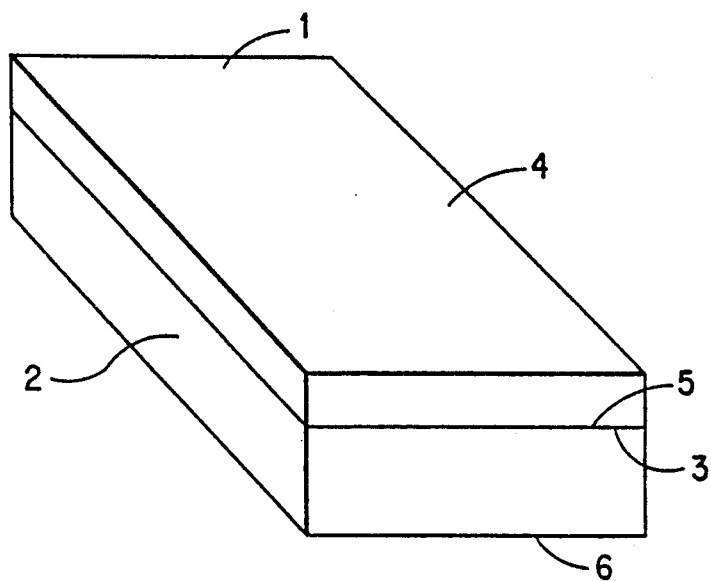
FIG. 1 is a perspective view of a photohardenable film removably adhered to a support.

This invention pertains to a method of coupling an optical fiber with an optical waveguide device through a symmetrically disposed opening located in front of the waveguide. This greatly facilitates the alignment of the waveguide embedded in the device with the waveguide of the optical fiber, and alleviates the need for accurate and very expensive equipment, which is otherwise required for the waveguide alignment.

Although any type of optical waveguide devices conforming to the requirements set forth herein may be used in accordance with this invention, the devices described in the detailed discussion of FIGS. 1-11 lend themselves to inherently more accurate positioning of a waveguide, and therefore they are preferred.

It should be understood that although the Figures illustrate only elementary optical waveguide devices for simplicity purposes, the degree of complexity of the individual devices does not have adverse consequences with regard to the present invention.

Throughout the following detailed description, similar reference numerals refer to similar parts in all Figures of the drawing. In addition, the word "element" is used to denote a constituent of a final optical waveguide device.

Referring to FIG. 1, an element is illustrated comprising a substantially dry photohardenable film 1 removably adhered to a support 2. The film 1 has a first surface 3 and a second surface 4. The support similarly has a first surface 5 and a second surface 6. The first surface 5 of the support 2 is removably adhered to the first surface 3 of the film 1. The surfaces 3, 4, 5 and 6 of the film 1 and the support 2 are preferably substantially flat.

The film 1 may have a thickness in the range of 2 micrometers through 15 micrometers or above, preferably in the range of 4.5 micrometers through 8.0 micrometers, and more preferably about 5.3 micrometers.

Figure 2A:
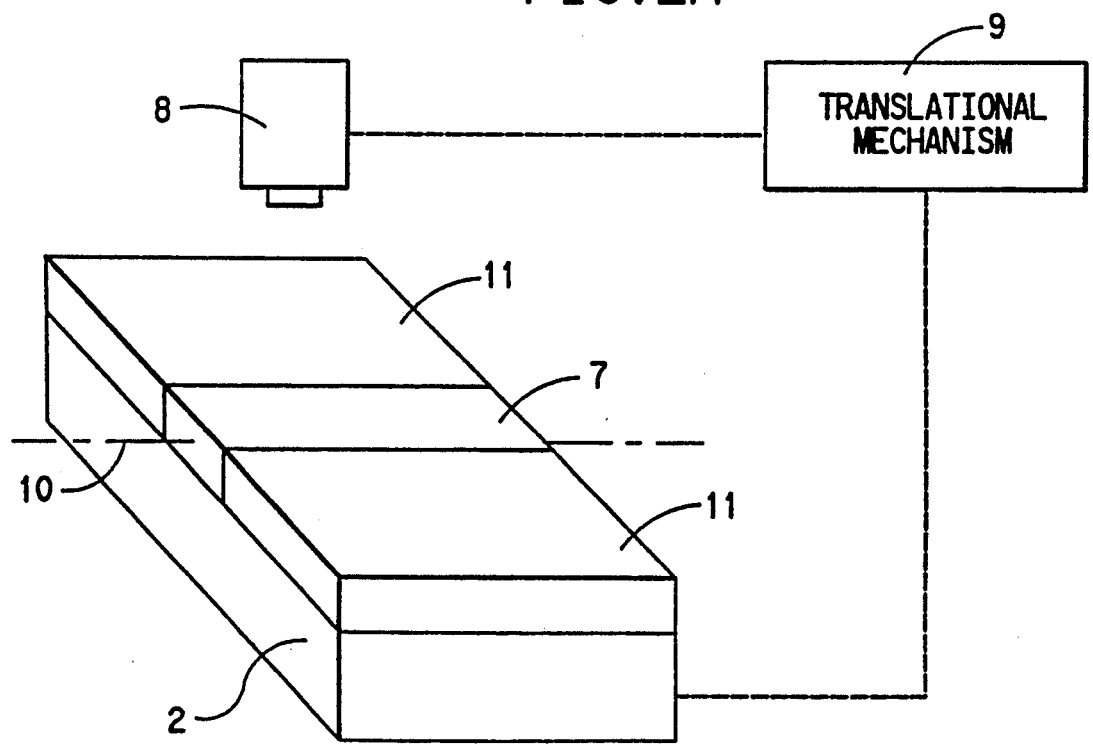
FIG. 2a is a schematic representation of a preferred way for forming an optical waveguide in a film on a support.
Figure 2B:
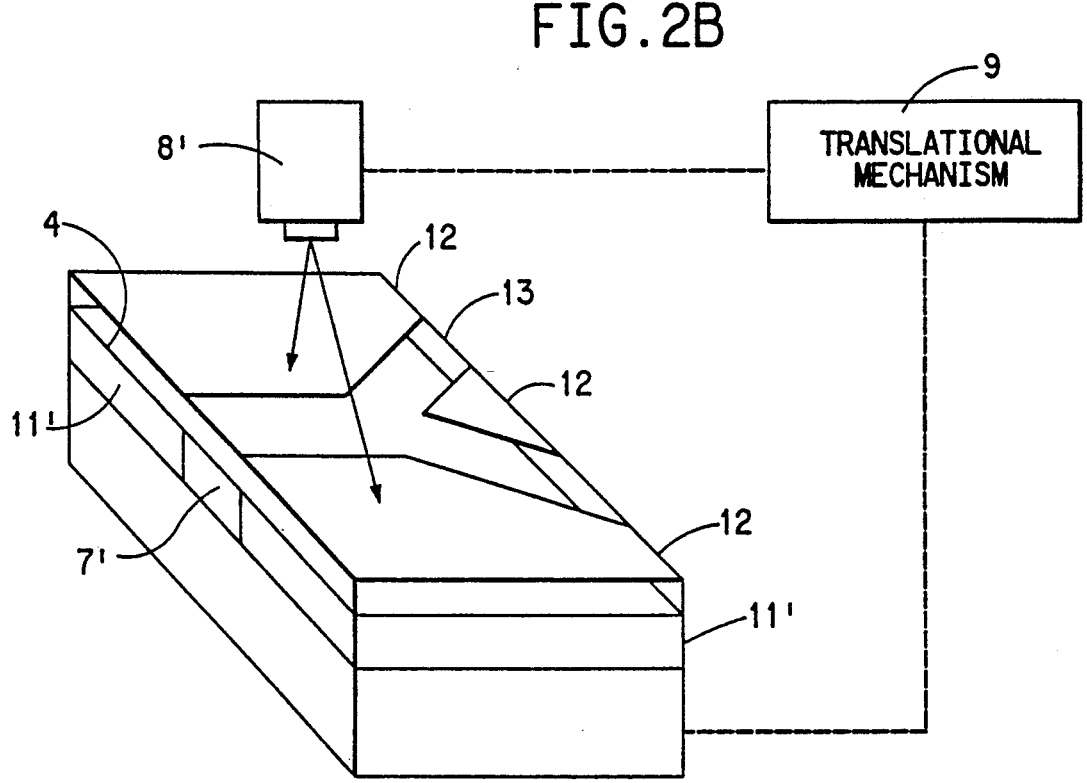
FIG. 2b is a schematic representation of a second preferred way for forming an optical waveguide having a Y configuration in a film on a support.
Figure 2C:
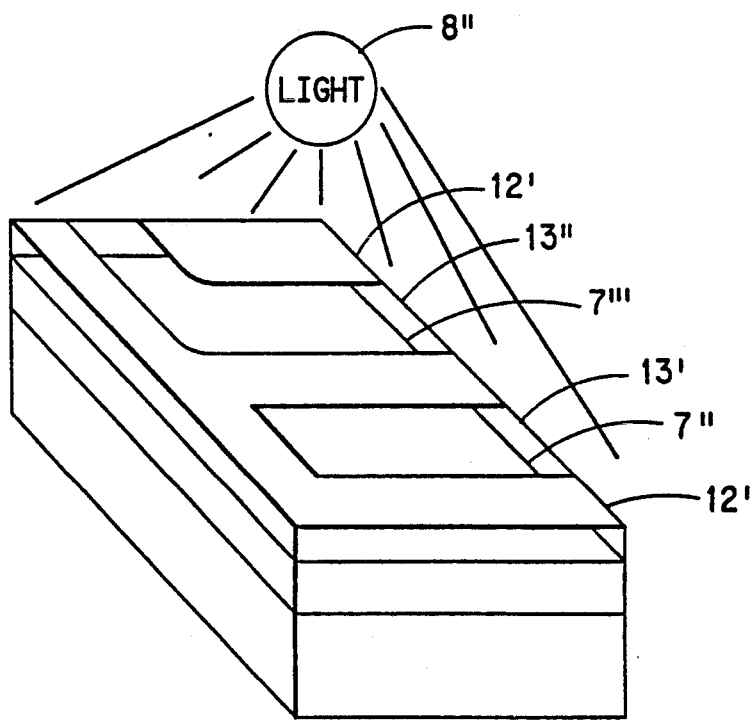
FIG. 2c is a schematic representation of a third preferred way for forming an optical waveguide having a different configuration in a film on a support.

Referring to FIGS. 2a, 2b, and 2c, the first step of the method of making the preferred devices according to the present invention comprises exposing to light at least a first region 7 of the film 1 polymerizing at least one monomer in the film 1 and changing the refractive index of the region 7 to form at least a first optical waveguide. The term waveguide is defined by those skilled in this art to include the entire area that transmits radiant energy. This technically includes some area just around the exposed region can be considered to substantially be the waveguide. Upon exposure to light, a polymerization reaction is induced in the exposed region. It is believed that there is interdiffusion between the exposed and unexposed regions, at least near the interface of these regions. This interdiffusion changes and typically increases the density of the exposed region raising its refractive index creating a lens-like exposed region directing the light in a self focused fashion to create a narrow smooth walled waveguide of approximately the same dimension as a mask area or light beam width. Three ways for performing this first step are illustrated in FIGS. 2a, 2b and 2c.

In FIG. 2a, a focused laser light source 8 exposes the region 7 to form the waveguide. A translational mechanism 9 is connected to the laser light source 8 and/or the support 2 for moving the laser light source 8, the support 2 or both, to create the waveguide having a desired and/or predetermined pattern. Here, the exposed region 7 has a substantially elongated box configuration having an optical axis 10 through the longitudinal center of the region 7. A physical cross section of the exposed region 7 perpendicular to the optical or center axis 10 is substantially rectangular. On both sides of the region 7 are remaining unexposed regions 11 of the film 1.

FIG. 2b shows an alternate way for exposing a region 7'. Here, a non-focused laser light source 8' is generally directing actinic radiation toward the element of FIG. 1. An opaque mask 12 is positioned between the laser light source 8 and the film 1, typically contacting and covering the second film surface 4. The mask 12 has at least a patterned area 13 therein through which actinic radiation from the light source 8' exposes region 7'. The patterned area can have any desired configuration, including the substantially Y configuration shown in FIG. 2b.

Exposing the region 7' through this area 13, results in the creation of a waveguide having a substantially Y configuration. Described more generically, the region can have one end adapted to inlet or outlet light connected to a plurality of ends (e.g., 2, 3, 4 . . . ) adapted to inlet or outlet light. As in the FIG. 2a case, there are remaining unexposed regions 11' in the film 1.

A third way for performing the exposing step of the present method is illustrated in FIG. 2c. Here, actinic radiation from a light source 8" exposes a first region 7" and a second region 7'" of the film 1 through an opaque mask 12'. This mask 12' has first and second areas 13' and 13" for the light to pass through exposing regions 7" and 7'", respectively. The second area 13" approaches and is in part parallel to the first area 13'. Thus, after exposure, the exposed second region 7'" and the corresponding waveguide. As a result, the waveguides can be positioned to exhibit evanescent coupling of light injected into one of the waveguides by gradually leaking or coupling the injected light into the other waveguide.

In each of these preferred ways, after exposure, the first and second surfaces 3 and 4 of the film 1 remain substantially flat. This facilitates subsequent laminating of layers on the film surfaces. As such, FIGS. 2a, 2b and 2c illustrate the making of optical waveguide elements, useful in making optical waveguide devices, which in turn are useful in integrated optical systems.

Figure 3:
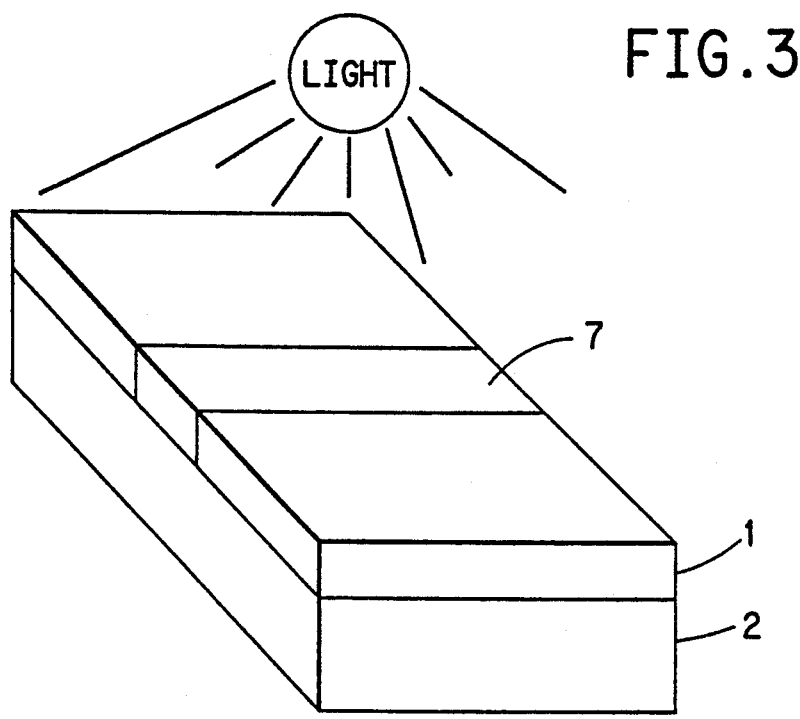
FIG. 3 depicts an optional step of flooding the film having a waveguide on a support with light.

FIG. 3 illustrates an optional step which follows the exposing step. The element resulting from the exposure step can be flooded with light, such as broadband ultraviolet light. This polymerizes some of at least one monomer in the film and typically most or all of one or all of the monomers in the film. This may allow for easy removal or attachment of the support 2. This resulting optical waveguide element can similarly be used in making optical waveguide devices, which devices ar preferably used in the present invention.

Figure 4:
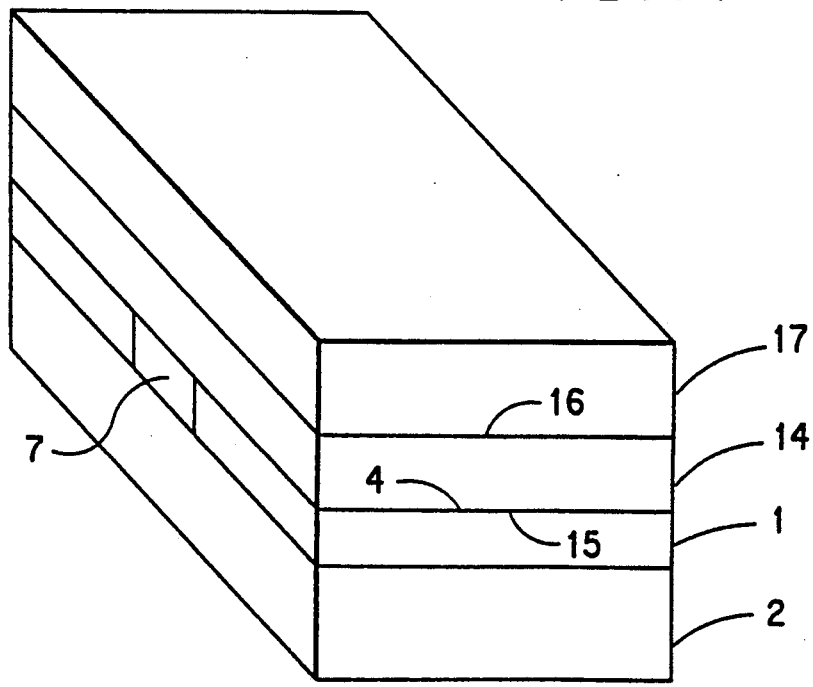
FIG. 4 shows a laminated structure comprising from top to bottom a support, a photohardenable layer, a film having a waveguide, and another support.

Next, referring to FIG. 4, a first substantially dry photohardenable layer 14 is laminated to the second film surface 4. The first layer 14 has first and second surfaces 15 and 16, respectively. The first layer 14 first surface 15 is laminated to the second film surface 4 by placing them in intimate contact and controllably applying pressure with rollers to remove air between the film 1 and layer 14. The first layer 14 is tacky. If the optional flooding step illustrated in FIG. 3 is not performed, then the film 1 is also tacky. Thus, the film 1 and first layer 14 easily adhere to one another. A support 17 is removably adhered to the second surface 16 of the first layer 14. FIG. 4 illustrates another optical waveguide element useful in making optical waveguide devices, which devices are preferably used in the present invention.

Figure 5:
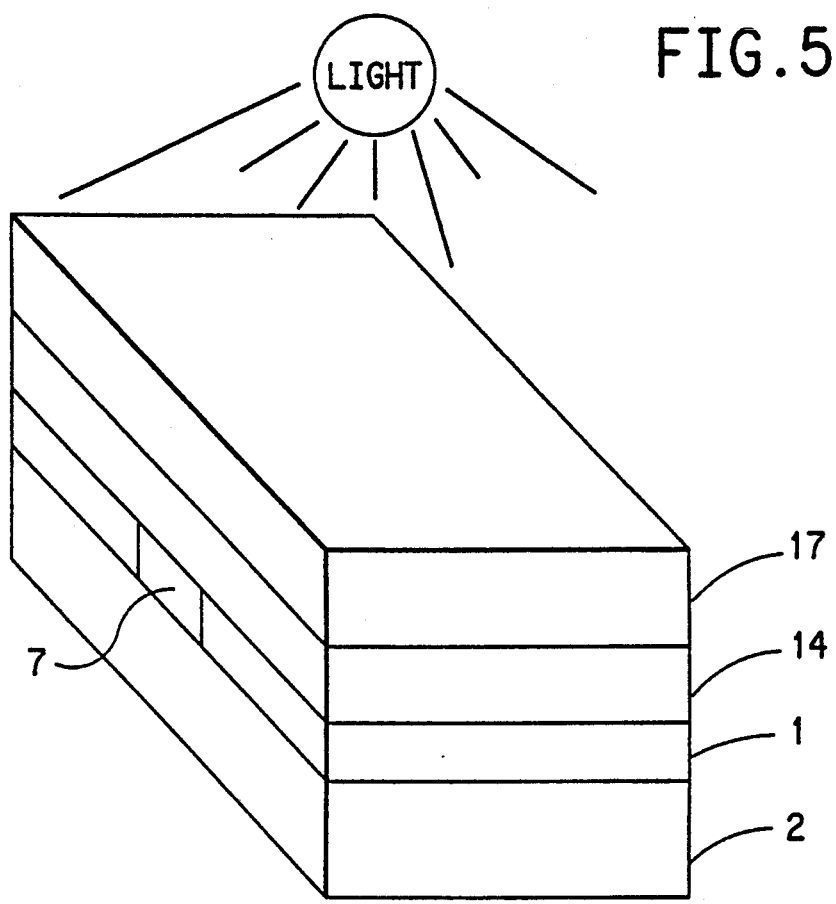
FIG. 5 illustrates an optional step of flooding the structure of FIG. 4 with light.

FIG. 5 shows an optional flooding step similar to that illustrated in FIG. 3, except the element being flooded is modified as described in relation to FIG. 4. The element resulting from the first lamination step can be flooded with light, such as broadband ultraviolet light. This polymerizes some of at least one monomer (and typically most or all of one or all of the monomers) in the first layer 14 and further polymerizes some of the at least one monomer in the film 1 (if not already polymerized by a previous flooding step). Extensive crosslinking or polymerization occurs between the monomer(s) of the layer 14 adjacent to the monomer(s) of the film 1 forming a diffuse boundary line or region. The resulting optical waveguide element is also useful in making an optical waveguide device in accordance with this invention.

Figure 6:
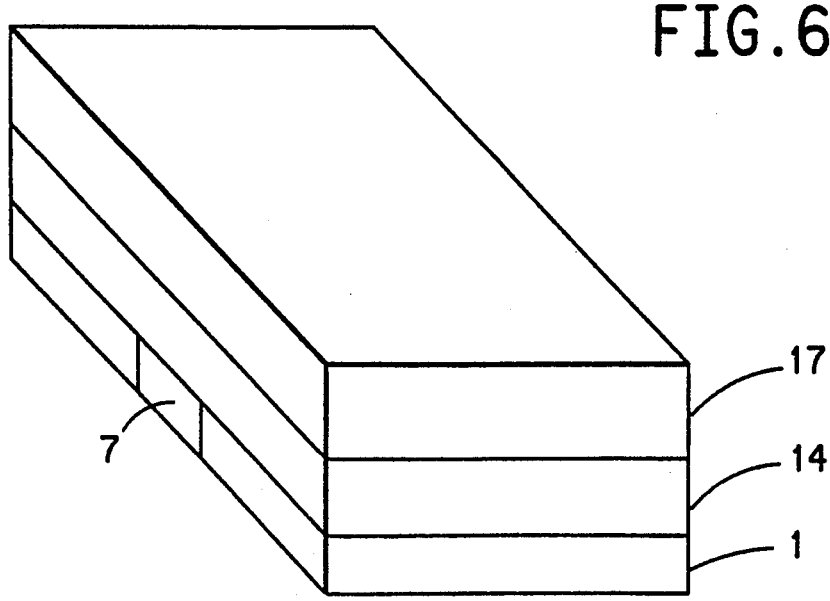
FIG. 6 is the structure of FIG. 4 or 5 with one of the supports removed.

FIG. 6 shows the element after the next step of removing the support 2 from the film 1 first surface 3.

Figure 7:
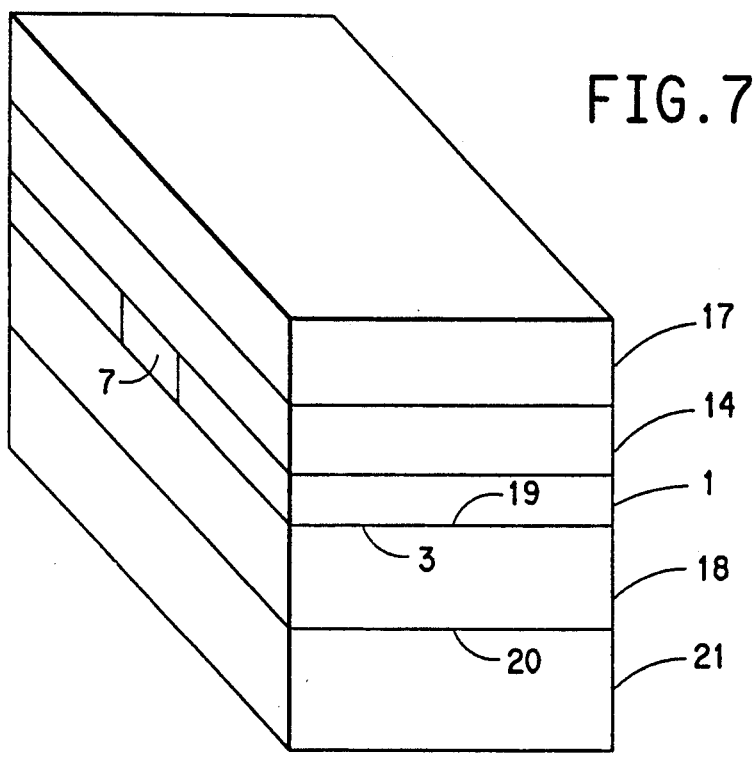
FIG. 7 is a perspective view of an optical waveguide device comprising from top to bottom a support, a photohardenable or photohardened layer, a film having a waveguide, a photohardenable layer, and a support.

Then, referring to FIG. 7, a second substantially dry photohardenable layer 18 is laminated to the film first surface 3. The second layer 18 has first and second surfaces 19 and 20, respectively. The second layer 18 first surface 19 is laminated to the film first surface 3 by placing it in intimate contact and controllably applying pressure with rollers removing air between the film 1 and second layer 8. The second layer surfaces 19 and 20 are tacky and, thus, easily adhere to the film 1. A support 21 is removably adhered to the second layer second surface 20.

Figure 8:
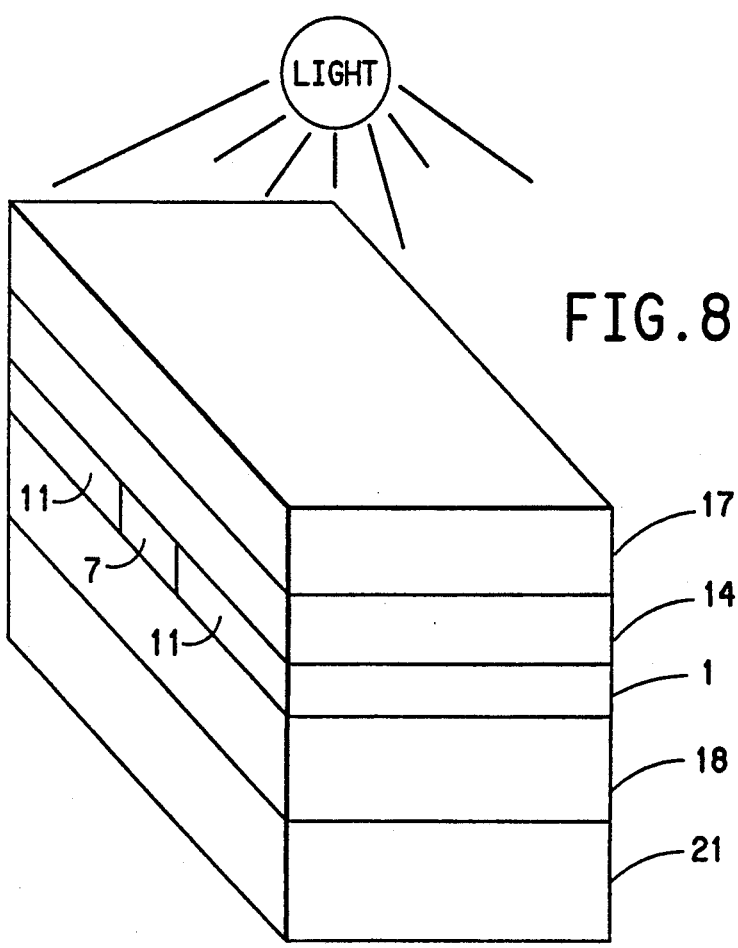
FIG. 8 shows the step of hardening the device of FIG. 7 by flooding it with light.

FIG. 8 illustrates a step of hardening the structure depicted in FIG. 7 by flooding it with light, such as broadband ultraviolet light. Throughout this application, the term "broadband ultraviolet light" means light in the spectral region of about 350 through 400 nanometers. This step occurs for minutes, preferably 5, but can last longer. If this is the first flooding step, then this is the first polymerization of at least one monomer (and typically most or all of one or all monomers) in the remaining regions 11 in the film 1 and the first and second layers 14 and 18, respectively. It further polymerizes the at least one monomer in the region 7 of the film 1. If this is not the first flooding step, it polymerizes at least one monomer in the second layer and continues polymerizing the at least one monomer in the rest of the element.

Some crosslinking or polymerization occurs between the previously polymerized film 1 and the monomer(s) in the second layer 18 forming a boundary line or region that is more evident than if the film 1 had not previously been flooded with light. Further, if this is not the first flooding step, for instance if buffer layer 14 was previously hardened by flooding it with light as illustrated in FIG. 5, then it would be preferred to harden the film and the buffer layer 18 of the element illustrated in FIG. 8 by flooding light first through support 21, layer 18, film 1, layer 14, and then support 17. In other words, the structure should be flooded such that light passes through unhardened layers or films before previously hardened ones.

Furthermore, any one or all of the buffer layers and the film with a waveguide formed therein can be hardened by flooding them with light before the layers or film are laminated to the other parts. A device results having at least one buried channel waveguide in a laminated and photohardened matrix useful in integrated optical systems.

Figure 9:
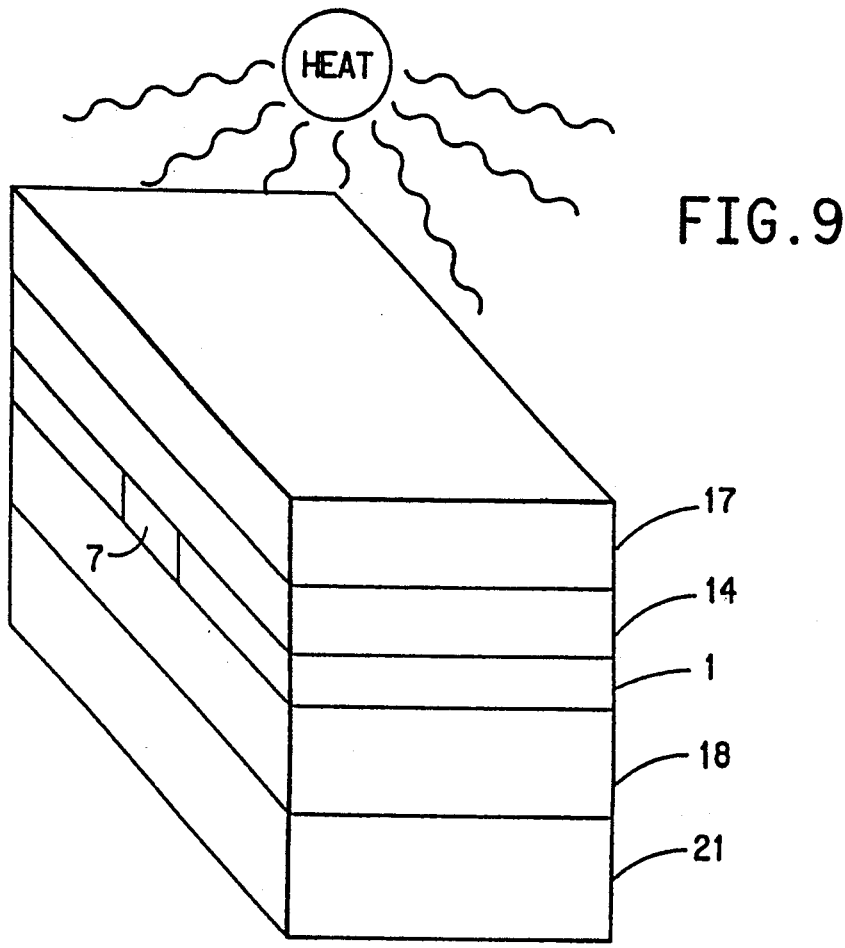
FIG. 9 shows the step of hardening the element of FIG. 7 or the device of FIG. 8 by heating it.

FIG. 9 illustrates another possible step of hardening the structure depicted in FIG. 7 by heating it. Actually, the layers and film can be heated before, in combination with, after, or in lieu of the light flooding step to harden or further harden the device. This heating step occurs at a temperature in the range of about 50° C. through 200° C. and preferably in the range of about 90° C. through 150° C. for a duration of minutes, preferably 5.

Photohardenable compositions are typically less sensitive to temperatures up to 100° C. than above 100° C. However, hardening may be initiated as low as 50° C. of held at the temperature for a sufficient period of time. As the temperature is increased beyond 100° C., thermally initiated hardening increases significantly.

After the hardening step, a maximum refractive index increase in the localized waveguide region as measured by an ASUJENA Interphako microscope occurs in the film in the range of 0.001 through 0.040 measured at 551 nanometers wavelength. The localized refractive index increase, $\Delta n$, may be derived by conventional shearing interference microscopy techniques and is calculated assuming a uniform index shift through the film such that $\Delta n$ is effectively an average using the following equations:

$$f\lambda = \Delta nd$$

$$f = \frac{a}{b}$$

$$\frac{a\lambda}{b} = nd$$

where
d = assumed waveguide thickness, typically the film thickness
a = maximum fringe shift of waveguide relative to suround
b = fringe spacing
$\lambda = 0.551\mu$, wavelength of light in the microscope This localized refractive index increase is contrasted and is not to be confused with a refractive index modulation measured from gratings prepared holographically, such as described in U.S. Pat. No. 4,942,112.

After the hardening step, the waveguide is transparent in the range of 0.6 through 1.6 micrometers wavelength. It is effectively transparent at 1.3 micrometers for single mode operation. Also after the hardening step, the maximum refractive index of the matrix except in and near the waveguide is in the range of 1.45 through 1.60, measured at white light from an incadescent source, depending on formulation and/or extent of interlayer diffusion from adjoining layers or film of different indexes. The refractive index is determined by using an ABBE refractometer manufactured by Karl Zeiss.

Figure 10:
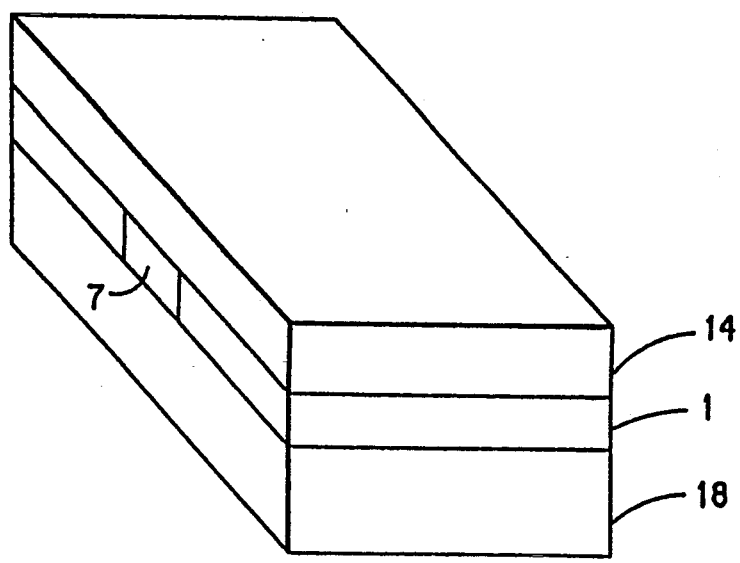
FIG. 10 is a perspective view of an optical waveguide device for use in integrated optical systems, the device comprising from top to bottom a first hardened layer, a hardened film having a waveguide, and a second hardened layer.

The supports 17 and 21 can be removed from the device resulting from the hardening step as shown in FIG. 10.

It has been found that a time delay of 5 to 120 minutes, preferably 20 to 30 minutes, after each flooding step and before removal of support sheets facilitate interlayer diffusion and polymerization.

Figure 11:
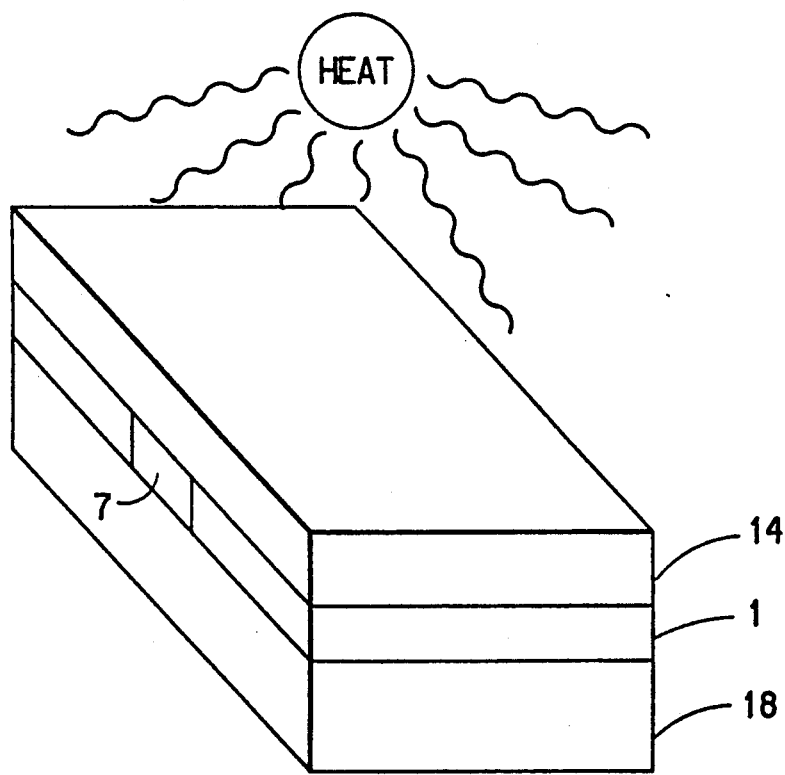
FIG. 11 shows the step of stabilizing the device of FIG. 10 by heating it.

FIG. 11 shows an optional, but preferred, step of stabilizing the device shown in FIG. 10 by heating it, typically after the hardening step. This heating step similarly occurs at a temperature in the range of about 50° C. thorough 200° C. and preferably in the range of about 90° C. through 150° C. However, this stabilizing step occurs longer than the hardening step. Preferably the stabilizing step occurs in the range of about 20 minutes through 2 hours and more preferably for about an hour. This heating makes the device more environmentally stable. Further, this heating provides thermal stabilization of optical and mechanical properties allowing operation of the resulting device over a wide range of temperatures without modification of the device properties.

In the device of FIG. 10 or 11, the first and second layers 14 and 18, respectively, have equal thicknesses since the films 14 and 18 are substantially identical, thus inherently serving the "symmetry" requirement. It is preferable for the purposes of this invention to select and cut the pieces of films 14 and 18 from adjacent areas of the same roll of film, in order to ensure identical thickness.

One of the advantages of this arrangement is the ease of adding one or more substantially dry photohardenable or photohardened layers on each side with or without a waveguide or grating, and build up any desired thickness, still serving the "symmetry" requirement.

All layers can be made out of the same material as the film. Then the hardened device matrix is substantially homogenous in composition and refractive index except in and near the waveguide. Preferably, however, after the hardening step, the waveguide has a refractive index about 0.005 and 0.060 greater than the surround. Of course, regardless of whether different materials are used for different layers and the film, the composition and refractive index in each exposed region is substantially homogenous in composition and refractive index.

Figure 12B:
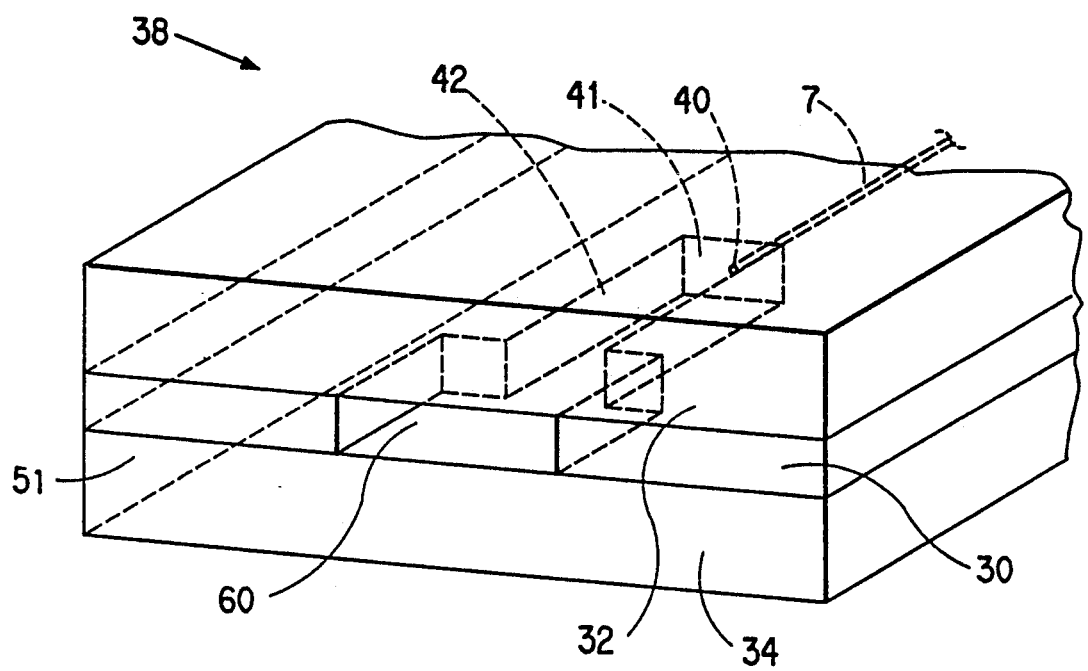
FIG. 12b illustrates an optical waveguide device.
Figure 12A:
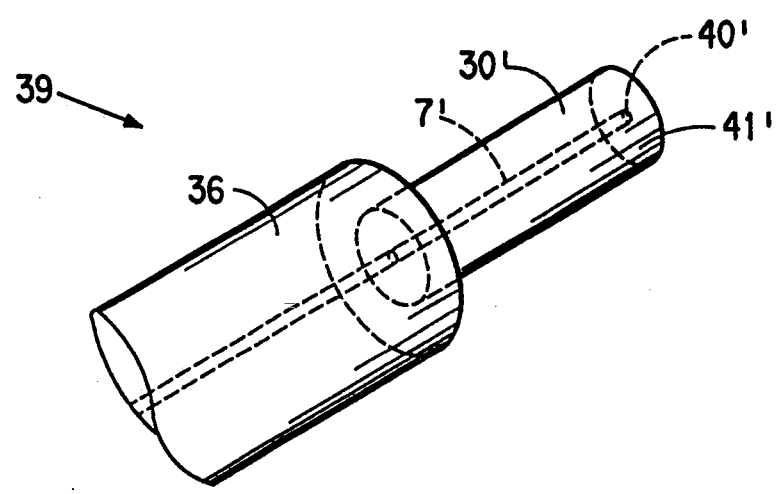
FIG. 12a illustrates an optical fiber composite structure.
Figure 13B:
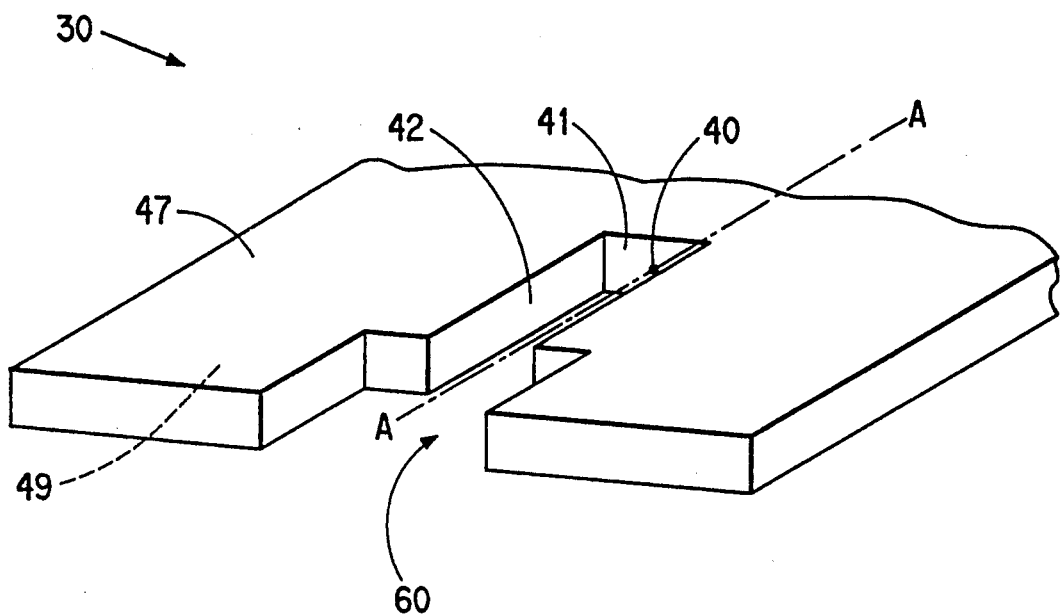
FIG. 13b illustrates the middle portion of an optical waveguide device.
Figure 13A:
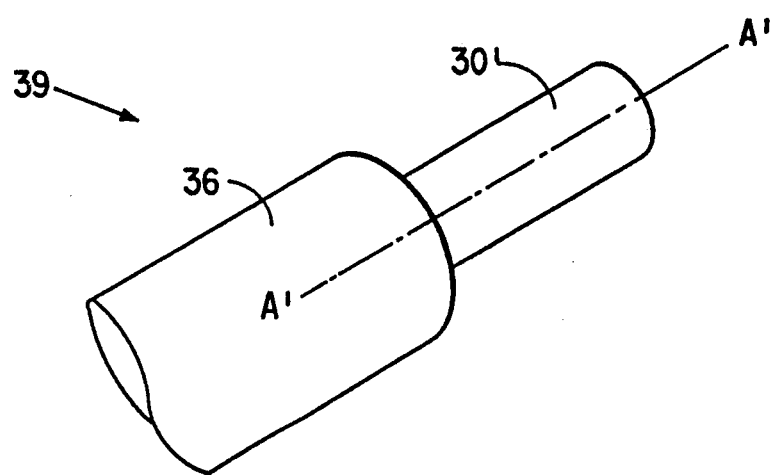
FIG. 13a illustrates an optical fiber composite structure having a center axis.

FIGS. 12a and 13a illustrate a conventional optical fiber composite structure 39 comprising a glass part 30' and an outside protective envelope 36, having usually a diameter of approximately 250 micrometers. In regard to this invention, the outside protective envelope 36 is immaterial, while the glass part 30' is of substantial importance. Thus, the glass part 30' may be referred to also as the optical fiber, the fiber, the glass fiber, or the optical glass fiber, without implying distinction between these terms, which should be considered as synonyms.

Although, glass is the predominant material of construction of optical fibers at the present time, other materials of construction having similar physical characteristics, such as for example polymethylmethacrylate, may also be utilized in the practice of this invention.

The optical fiber has a central region 7' of different (usually higher) refractive index than the rest of the fiber, which serves as a waveguide. The diameter of the optical fiber is nominally 125 micrometers, while that of the waveguide is about 8-9 micrometers. In certain occasions, there is a depressed cladding area (not shown) surrounding the waveguide, having a diameter of nominally 60 micrometers, through which, a small amount of light is also transmitted. As a matter of fact in all cases of optical fibers, with or without the depressed cladding area, some light travels outside the waveguide. The optical fiber 30', the depressed cladding area (not shown) if present, as well as the waveguide are characterized by a common optical or center axis A'—A', which is also an axis of symmetry. The optical fiber 30' has a first end surface 41', which is substantially perpendicular to the center axis A'—A'. The intersection of the waveguide 7' and the first end surface 41' define a first end-point 40'.

FIG. 12b illustrates an optical waveguide device 38, which comprises a waveguide 7. The waveguide 7 has a second optical or center axis A—A, illustrated in FIG. 13b, and a second end-point 40. There is also shown an opening 42 of substantially square cross-section, disposed symmetrically in front of the second end-point 40 in a direction substantially parallel to the direction of the waveguide 7. The opening has a second end-surface 41. The second end-point 40 may also be defined as the cross-section of the waveguide 7 and the end-surface 41. By the expression ". . . disposed symmetrically in front of . . . ", it is meant that the axis A—A is perpendicular to the square cross section of the opening 42, and it passes through the intersection of the diagonals of the square cross section at any point along the opening 42. Opposite to the second end-point 40, there is preferably an insertion cavity 60, which in combination with the opening 42 gives the appearance of a "T" shape.

According to the preferred embodiments of this invention, the middle portion 30 of the optical waveguide device 38 is formed as described in other sections of this discussion, wherein the waveguide is photoimaged in a "Waveguide Layer", followed by sandwiching the "Waveguide Layer" 1 between a pair of "Inner Buffer Layers" 14 and 18, as well as a pair of "Outer Buffer Layers" 17 and 21. The layers of each pair are preferably selected from adjacent areas of the same photopolymer sheet, so that the thickness is the same for all practical purposes. This procedure ensures that the waveguide 7, and therefore the second end point 40, are equidistant from the outer surfaces 47 and 49 of the middle portion 30. These surfaces are also substantially parallel to each other.

Forming the opening 42 is preferably performed by ablation and in the form of a slot as better shown in FIG. 13b. It is preferable that the opening 42 is ablated by the use of a laser, and more preferably by an excimer laser. A method for providing excimer ablated fiber channels or openings for passive (without need of alignment equipment) coupling involves a computer controlled image processing and positioning system. The excimer laser is masked by a rectangular aperture and is projected onto the optical waveguide device though a 15× reduction lens. The aperture's width is adjusted until the correct channel width for passive coupling is achieved. For preferred present applications, this width is approximately 115 to 125 micrometers wide (as measured by the computer) at the plane of the middle portion 30. This width is substantially the same as the thickness of the middle portion 30, so that a substantially square crosssection of the opening is achieved. A "sample" channel is preferably created away from the work area. This sample channel is digitized and analyzed for width; the center and angular orientation are determined by an image processing system, and this image along with the rest of the data, are stored as a reference that will be used to align other waveguides. At this point a waveguide is brought into the field of view, and the optical waveguide device is aligned laterally and rotationally, iteratively, until preferably within tolerance of the reference channel alignment ±0.5 micrometers laterally, ±0.25 degrees rotationally). Then the actual opening to this waveguide is ablated; fluence approximately 2.5J/cm2, repetition rate 10 Hz, 30 sec. This procedure is repeated using the stored reference opening image on the rest of the waveguides to be processed. The insertion cavity 60 may be also formed using similar techniques.

After the opening 42 and the insertion cavity have been ablated, packaging layers 32 and 34 are laminated on the parallel surfaces 47 and 49 of the middle portion 30. After lamination, the front part of this laminate may be microtomed to form a flat front side 51.

Figure 14:
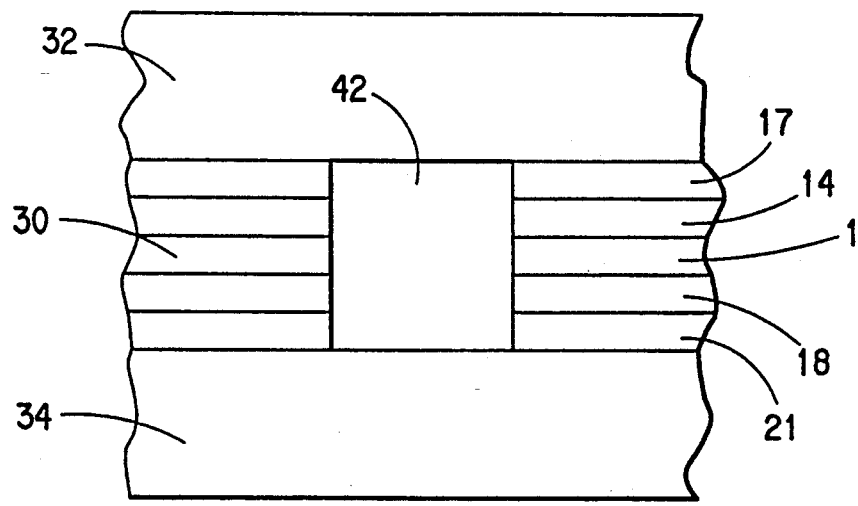
FIG. 14 shows a cross section of a waveguide device illustrating the different layers surrounding a symmetrical opening.

A more detailed view of a cross-section of the opening 42 and the surrounding composite laminate of different layers of the device 38 is depicted in FIG. 14, wherein the "Waveguide Layer" 1 is sandwiched between a pair of "Inner Buffer Layers" 14 and 18, a pair of "Outer Buffer Layers" 17 and 21, and a pair of packaging layers 32 and 34. As it can be seen in this case, the top and bottom of the opening 42 are part of the packaging layers 32 and 34, while the sides are part of the rest of the layers.

Figure 15:
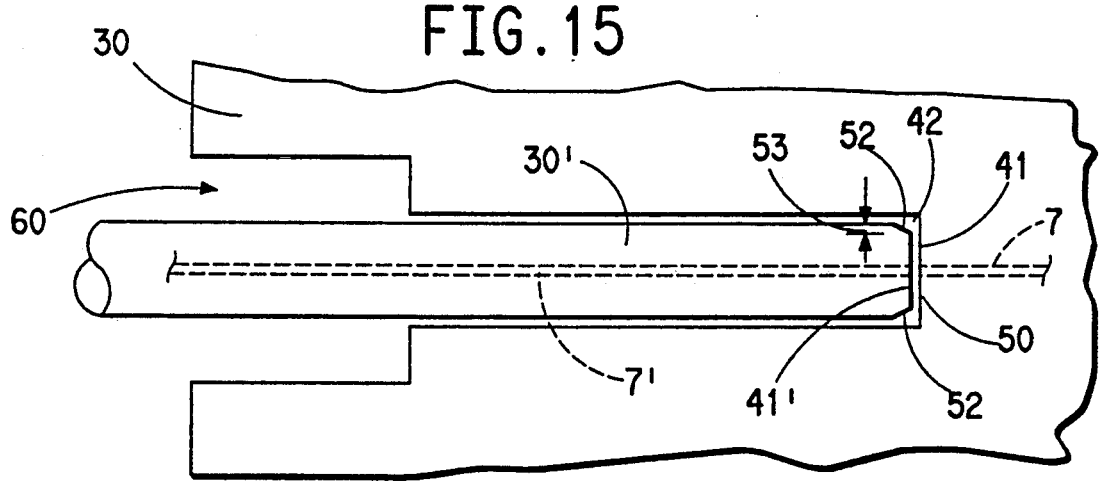
FIG. 15 shows a cross section of an optical fiber inserted in the symmetrical opening of an optical waveguide device.

In continuing the coupling process, the optical fiber 30' is inserted initially through the insertion cavity 60 and then through the opening 42, until the first end surface 41' assumes a predetermined distance 50 from the second end surface 41, as better shown in FIG. 15. This distance should preferably be between 2 and 10 micrometers and more preferably between 4 and 6 micrometers. In order to make insertion of the optical fiber 30' easier, bevelling 52 is performed at the end portion of the fiber. Preferably, the bevelled part 52 should not reach the depressed cladding area (not shown), which surrounds the first waveguide 7', if present. More preferably, the bevelled part should have a depth 53 between 2 and 10 micrometers, and even more preferably between 4 and 6 micrometers.

Good alignment or self-centering of the first waveguide 7' with the second waveguide 7 is achieved when the diameter of the optical fiber 30' is substantially equal to the side of the cross section of the opening 42. However, the alignment and self-centering may be assured to have much better reproducibility and accuracy when the diameter of the optical fiber 30' is somewhat larger than the side of the square cross section of the opening 42. For example, in the case of an opening having a nominal side of 120 micrometers, the diameter of the optical fiber should preferably be 2 to 10 micrometers larger, and more preferably 4 to 6 micrometers larger.

Since simple mechanical contact may leave air-gap regions between the waveguide ends, it is highly preferable that a liquid is placed between the ends of the waveguides to fill such gaps. This liquid should have a refractive index which matches as close as possible the refractive indices of the waveguides involved. It is preferable that this liquid possesses adhesive characteristics in order to secure the optical fiber and the respective device in place. It is even more preferable that the curing of the adhesive liquid is a photohardenable one, and thus is cured by a photohardening mechanism. This is preferred not only because most of the steps of making the devices of the instant invention involve actinic radiation, but also and more importantly because an independent heating step may be employed for expanding the liquid before its cure. In addition, by selecting similar or in general appropriate monomers or oligomers, initiators, and other adjuncts, in appropriate amounts, one may approximate and match the desirable refractive index with higher accuracy and broader formulation and condition latitude. Thermally cross lincable polymers may also be used as long as they substantially cross link at such temperatures which do not interfere with the thermal steps necessary in the practice of this invention. The technique of using such adhesive formulations may be applied not only for the devices of the present invention, but also in any other case, where the free ends of two embedded waveguides come high proximity or contact for the purposes of coupling, including connectors, couplers, splitters, fiber embedded waveguides, and the like, as well as combinations thereof.

Figure 16:
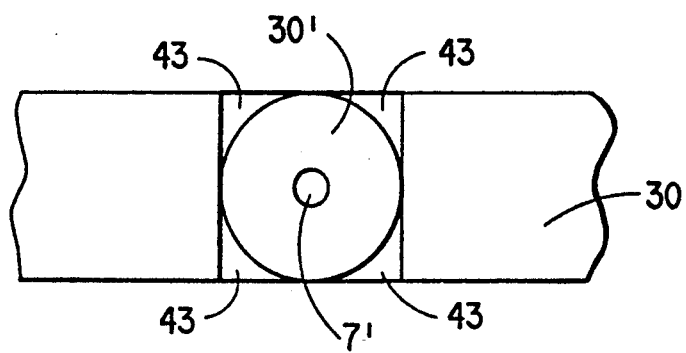
FIG. 16 illustrates a cross section perpendicular to the one shown in FIG. 15.
Figure 17:
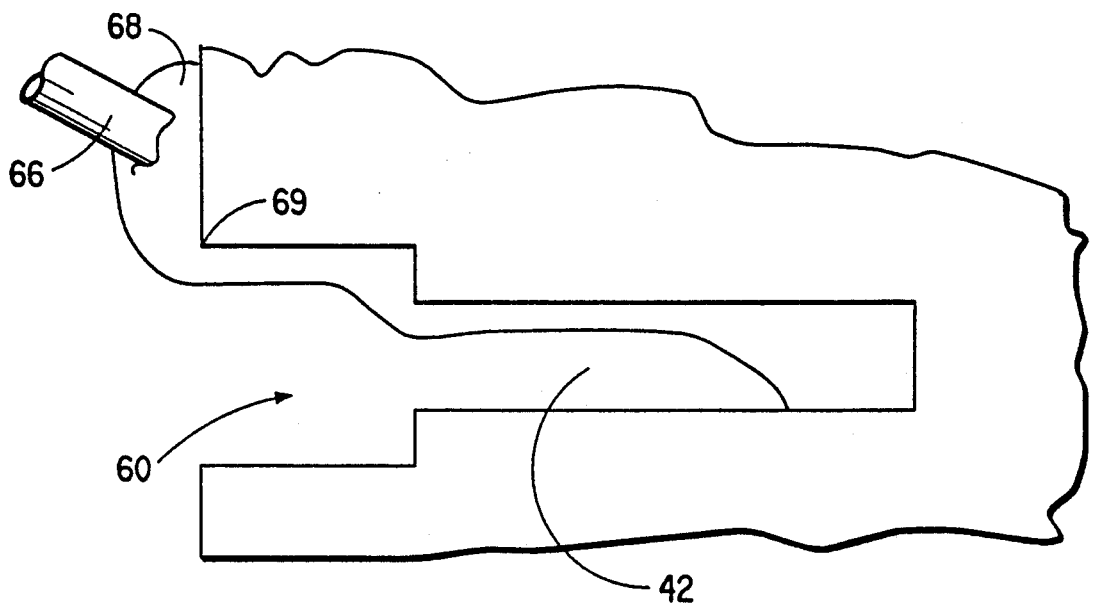
FIG. 17 illustrates a method of inserting liquid adhesive in the symmetrical opening of a waveguide device.

Thus, it is preferable that either before or after the insertion of the optical fiber 30' into the opening 42, a photohardenable adhesive is used to secure the fiber in place and eliminate air-gap regions between the waveguides. It should be realized that even after insertion of the optical fiber in the opening 42, a remanent opening 43, as better shown in FIG. 16, resulting from the square cross section of the opening 42 and the circular cross section of the optical fiber 30' is left behind. Thus, the remanent opening 43 may accept the adhesive by capillary action, even after the insertion has taken place. It is, however, preferable that the adhesive is applied before the insertion step of the optical fiber 30'. The application of the adhesive may be conducted by means of a microtube, such as the one used in example 2, and as illustrated in FIG. 17. In place of the microtube, a thin wire with a loop may be used. An example of such a wire is one made of gold for inertness, and having a diameter of 10 to 30 micrometers. A drop may be placed in the close vicinity of the insertion cavity 60, so that the drop overlaps the lip 69 of the cavity. Due to wetting and surface tension phenomena, the adhesive 68 fills the opening 42 first and then the insertion cavity 60. For better wetting, the adhesive should have lower surface tension than the surface tension of the optical fiber 30' and the surface tension of the opening 42 and cavity 60. Since, upon subsequent insertion of the optical fiber 30', some of the adhesive 68 also overflows into the front flat side 51 within a small area surrounding the optical fiber 30', it is preferable that this flat side has also higher surface tension than the adhesive. Monomers, oligomers, polymers, initiators, chain transfer agents and other constituents like the ones used for the fabrication of the devices, and described herein may also be used for making the optically matching liquid, which as aforementioned, is preferably also an adhesive when photohardened. Of course, any other materials may be used as long as the requirements set forth are met.

Figure 18:
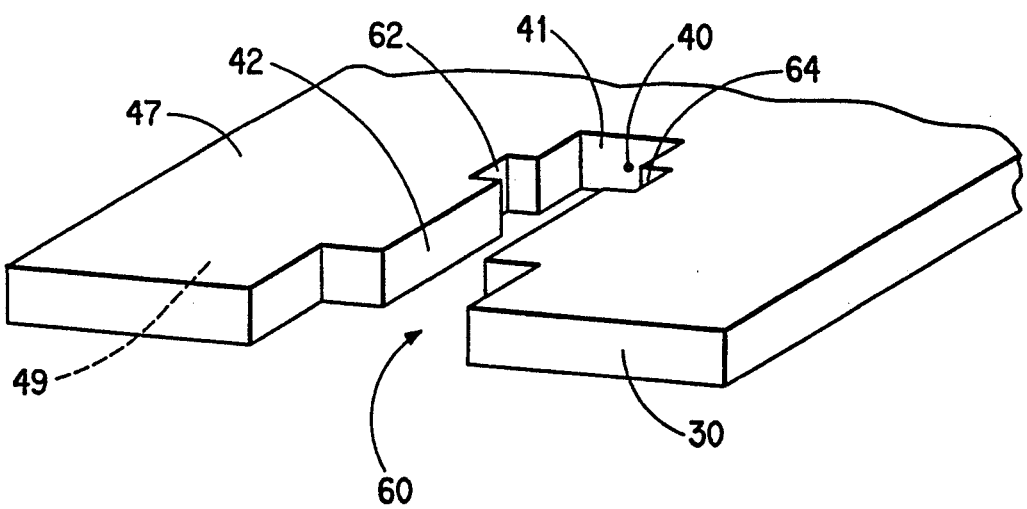
FIG. 18 illustrates the middle portion of an optical waveguide device with a symmetrical opening having two pockets.

To improve further the strength of the coupling, one or more pairs of pockets 62 and 64, as illustrated in FIG. 18 may be also ablated along the opening 42. These pockets, after receiving the liquid adhesive, act as anchoring sites to secure better the optical fiber 30' in the opening 42.

The pockets are preferably 10 to 50 micrometers, and more preferably 10 to 20 micrometers out from the edge of the opening 42. They are preferably located approximately 100 to 200 micrometers from the end surface 41. Thus, the pockets 62 and 64 create a region where liquid adhesive can further bond to the optical waveguide structure and the glass fiber, providing a plug which prevents the optical fiber from being pulled out easily and helps pin the optical fiber to the waveguide interface, preventing displacement under temperature-induced shear forces.

It is preferable, especially in the case where the diameter of the optical fiber 30' is larger than the side of the cross section of the opening 42, that the step of inserting the optical fiber 30' into the opening 42 is conducted at temperatures, which are somewhat elevated as compared to room temperature, in order to facilitate the insertion and avoid delamination of the different layers of the waveguide device 38. At these somewhat elevated temperatures, the waveguide device 38 is plastisized or softened just adequately to facilitate insertion of part 30, and prevent delamination without causing unacceptable distortion of the waveguide device and without affecting the self centering of the waveguides 7 and 7' with respect to each other during the insertion step. Temperatures of the order of 40°–50° C. are preferable for this step.

In other words, the use of heat provides a light softening of the material during fiber insertion and it is an important part helping prevent unduly high forces from delaminating the material. In addition, immediate insertion is also important to prevent delamination because of possible swelling as liquid adhesive diffuses into the surround. Further, the timing of insertion versus swelling can provide additional tolerance for the width of the ablated opening 42, in cases where the ablated size deviation results in a width slightly larger than that of a typical optical fiber, or greater than 124 micrometers, when a somewhat delayed insertion would be preferable. The important consideration is often to avoid undue pressure from the optical fiber 30' as it is inserted in to an opening of inadvertently ablated incorrect low dimensions. In general, however, immediate insertion of the optical fiber is preferred.

Unpolymerized liquid adhesives may have a tendency to free debris from the edges of the opening, the longer the adhesive stays unpolymerized as a liquid in the opening 42. This effect can produce a collection of floating debris within the opening itself. Thus the preferred fiber coupling technique is to push the fiber in soon after insertion of liquid adhesive and rapidly position it directly in front of the waveguide so that debris cannot be compacted at the end of the slot. An alternative approach is to flush out any debris with fresh liquid adhesive.

The liquid adhesive also diffuses into a diffusion region (nominally 40 micrometers) providing a distribution of shear forces during heat cycling between the glass, whose expansion coefficients are nominally one part per million, and the optical waveguide device, including the adhesive, whose expansion coefficient is nominally 100 to 120 parts per million. This distribution of shear forces helps prevent the breakdown of the bond of the glass fiver 30' to the device 38 during temperature cycling.

It is important that after both the optical fiber 30' and the photohardenable adhesive are in place, the temperature is raised further to a higher predetermined point, and the photohardening or photocuring of the adhesive is conducted at this higher point or level of temperature. The higher level of temperature has to be adequately high in order to reduce or prevent temperature versus optical-throughput oscillations of the coupled device at temperatures lower than the predetermined point. These oscillations manifest themselves as repeated cycles of increase followed by decrease of the optical throughput of the coupled device as the temperature of the device, at which each measurement is made, changes. Temperatures of the order of 60° to 90° C. are preferable with the presently employed photopolymers. Temperatures considerably lower than 60° C. start loosing their effectiveness, while temperatures considerably higher than 90 soften excessively the currently utilized photopolymer layers of the waveguide device. It is speculated by the applicants that the oscillations (Fabry-Perot like optical oscillations) are due to opening up of the fiber-to-waveguide contact, and formation of a gap, as the temperature changes, since the device has an expansion coefficient approximately 100 times higher relative to that of the glass fiber. The thickness of the gap changes then with temperature, and affects the throughput according to the relation of the thickness of the gap with respect of the wavelength of the light trying to pass through. On the other hand, when the photocuring is conducted at an elevated temperature, the waveguide device 38, made of layers of photopolymers, is in a highly expanded state as compared to the optical fiber 30', and the opening 42 takes a larger amount of liquid photohardenable adhesive. Thus, when the coupled device, made in this manner, is brought to lower temperatures, as the temperature continues decreasing, high compression is developed by the large shrinkage of the waveguide device. This compression is applied on the glass part 30' of the optical fiber 39 through the mass of the excessive adhesive, thus resisting the formation of the gap.

It should be pointed out, however, that the attempt to explain the phenomenon of these oscillations by the hypothesis of the formation of a gap must not be construed as restrictive to the scope of the present invention.

Use of adhesion promoters in the formulation of the photohardenable adhesive is very important, so that the coupling may perform under adverse conditions. The preferred adhesion promoters are silane based promoters since they mainly promote adhesion to glass, which is usually the weak point of adhesion in this application, if and when adhesive failure occurs.

Methacryloxypropyltrimethoxy silane is preferred. Examples of other photopolymerizable silane adhesion promoters, which may be used in the practice of this invention include but are not limited to:
methacrylpropyltrimethoxy silane
methacryloxypropyltris(vinyldimethyl-siloxy) silane
methacryloxypropyltrismethoxyethoxy silane
methacryloxypropyltrichloro silane
methacryloxypropylmethyldiethoxy silane
methacryloxylpropylmethyldichloro silane
methacryloxypropyldimethylethoxy silane
methacryloxypropyldimethylchloro silane
methacryloxypropylbistrimethylsiloxymethyl silane The concentration of the silane promoter in the adhesive formulation could be as broad as 0.5% to 97% by weight. A more preferred range is 1 to 25% and an even more preferred range is 8–16% by weight.

The photohardenable base and buffer layers used herein are thermoplastic compositions which upon exposure to actinic radiation form crosslinks or polymers of high molecular weight to change the refractive index and rheological character of the composition(s). Preferred photohardenable materials are photopolymerizable compositions, such as disclosed in U.S. Pat. No. 3,658,526 (Haugh) and more preferred materials are described in U.S. Pat. Nos. 4,942,102, 4,942,112, and in copending application Ser. No. 07/288,916 filed Dec. 23, 1988 and assigned to E. I. du Pont de Nemours and Company, Incorporated. In these materials, free radical addition polymerization and crosslinking of a compound containing one or more ethylenically unsaturated groups, usually in a terminal position, hardens and insolubilizes the composition. The sensitivity of the photopolymerizable composition is enhanced by the photoinitiating system which may contain a component which sensitizes the composition to predetermined radiation sources, e.g., visible light. Conventionally a binder is the most significant component of a substantially dry photopolymerizable base or layer in terms of what physical properties the base or layer will have while being used in the invention. The binder serves as a containing medium for the monomer and photoinitiator prior to exposure, provides the base line refractive index, and after exposure contributes to the physical and refractive index characteristics needed for the base layer of buffer layer. Cohesion, adhesion, flexibility, diffusibility, tensile strength, in addition to index of refraction are some of the many properties which determine if the binder is suitable for use in the base layer or the buffer layer.

Dry base or layer photohardenable elements contemplate to be equivalent are photodimerizable or photocrosslinkable compositions such as disclosed in U.S. Pat. No. 3,526,504 (Celeste) or those compositions in which hardening is achieved by a mechanism other than the free radical initiated type identified above.

While the photopolymerizable base or layer is a solid sheet of uniform thickness it is composed of three major components, a solid solvent soluble performed polymeric material, at least one liquid ethylenically unsaturated monomer capable of addition polymerization to produce a polymeric material with a refractive index substantially different from that of the performed polymeric material, or binder, and a photoinitiator system activatable by actinic radiation. Although the base or layer is a solid composition, components interdiffuse before, during and after imaging exposure until they are fixed or destroyed by a final uniform treatment usually by a further uniform exposure to actinic radiation. Interdiffusion may be further promoted by incorporation into the composition of an otherwise inactive plasticizer.

In addition to the liquid monomer, the composition may contain solid monomer components capable of interdiffusing in the solid composition and reacting with the liquid monomer to form a copolymer with a refractive index shifted from that of the binder. In the preferred compositions for use as the base layer or buffer layers in this invention, the preformed polymeric material and the liquid monomer are selected so that either the preformed polymeric material or the monomer contains one or more moieties taken from the group consisting essentially of substituted or unsubstituted phenyl, phenoxy, naphthyl, naphthyloxy, heteroaromatic groups containing one to three aromatic rings, chlorine, and bromine and wherein the remaining component is substantially free of the specified moieties. In the instance when the monomer contains these moieties, the photopolymerizable system hereinafter is identified as a "Monomer Oriented System" and when the polymeric material contains these moieties, the photopolymerizable system hereinafter is identified as a "Binder Oriented System."

The stable, solid, photopolymerizable compositions preferred for this invention will be more fully described by reference to the "Monomer Oriented System" and "Binder Oriented System." The Monomer Oriented System is preferred for the base layer.

The monomer of the Monomer Oriented System is a liquid, ethylenically unsaturated compound capable of addition polymerization and having a boiling point above 100 C. The monomer contains either a phenyl, phenoxy, naphthyl, naphthoxy, heteroaromatic group containing one to three aromatic rings, chlorine or bromine. The monomer contains at least one such moiety and may contain two or more of the same or different moieties of the group, provided the monomer remains liquid. Contemplated as equivalent to the groups are substituted groups where the substitution may be lower alkyl, alkoxy, hydroxy, carboxy, carbonyl, amino, amido, imido or combinations thereof provided the monomer remains liquid and diffusible in the photopolymerizable layer.

Preferred liquid monomers for use in the Monomer Oriented System of this invention are 2-phenoxyethyl acrylate, 2-phenoxyethyl methacrylate, phenol ethoxylate acrylate, 1-(p- chlorophenoxy) ethyl, p-chlorophenyl acrylate, phenyl acrylate, 1-phenylethyl acrylate, di(2-acryloxyethyl) ether of bisphenol-A, and 2-(2-naphthyloxy) ethyl acrylate.

While monomers useful in this invention are liquids, they may be used in admixture with a second solid monomer of the same type, e.g., N-vinyl-carbazole, ethylenically unsaturated carbazole monomers such as disclosed in *Journal of Polymer Science; Polymer Chemistry Edition*, Vol. 18, pp. 9–18 (1979) by H. Kamagawa et al., 2-naphthyl acrylate, penta-chlorophenyl acrylate, 2,4,6-tribromophenyl acrylate, and bisphenol A diacrylate, 2-(2-naphthyloxy) ethyl acrylate, and N-phenyl maleimide.

The solvent soluble polymeric material or binder of the Monomer Oriented System is substantially free of phenyl, phenoxy, naphthyl, naphthyloxy, heteroaromatic group containing one to three aromatic rings, chlorine and bromine.

Preferred binders for use in the Monomer Oriented system of this invention are cellulose acetate butyrate polymers; acrylic polymers and inter polymers including polymethyl methacrylate, methyl methacrylate/methacrylic acid and methylmethacrylate/acrylate acid copolymers, terpolymers of methylmethacrylate/C$_2$-C$_4$ alkyl acrylate or methacrylate/acrylic or methacrylic acid; polyvinyl acetate; polyvinyl acetal, polyvinyl butyral, polyvinyl formal; and as well as mixtures thereof.

The monomers of the Binder Oriented System is a liquid ethylenically unsaturated compound capable of addition polymerization and having a boiling point above 100 C. The monomer is substantially free of moieties taken from the group consisting essentially of phenyl, phenoxy, naphthyl, naphthyloxy, heteroaromatic group containing one to three aromatic rings, chlorine and bromine.

Preferred liquid monomers for use in Binder Oriented Systems of this invention include decanediol diacrylate, iso-bornyl acrylate, triethylene glycol diacrylate, diethyleneglycol diacrylate, triethylene glycol dimethacrylate, ethoxyethoxyethyl acrylate, triacrylate ester of ethoxylated trimethylolpropane, and 1-vinyl-2-pyrrolidinone.

While monomers used in Binder Oriented Systems are liquids, they may be used in admixture with a second solid monomer of the same type, e.g., N-vinyl-caprolactam.

The solvent soluble polymeric material or binder of the Binder Oriented system contains in its polymeric structure moieties taken from the group consisting essentially of phenyl, phenoxy, naphthyl naphthyloxy or heteroaromatic group containing one to three aromatic rings as well as chloro or bromo atoms. Contemplated as equivalent to the groups are substituted groups where the substitution may be lower alkyl, alkoxy, hydroxy, carboxy, carbonyl, amido, imido or combinations thereof provided the binder remains solvent soluble and thermoplastic. The moieties may form part of the monomeric units which constitute the polymeric binder or may be grated onto a pre-prepared polymer or interpolymer. The binder of this type may be a homopolymer or it may be an interpolymer of two or more separate monomeric units wherein at least one of the monomeric units contains one of the moieties identified above.

Preferred binders for use in the Binder Oriented System include polystyrene, poly (styrene/acrylonitrile), poly(styrene/ methyl methacrylate), and polyvinyl benzal as well as admixtures thereof.

The same photoinitiator system activatable by actinic radiation may be used in either the Monomer Oriented System or the Binder Oriented System. Typically the photoinitiator system will contain a photoinitiator and may contain a sensitizer which extends the spectral response into the near U.V. region and the visible spectral regions.

Preferred photoinitiators include CDM-HABI, i.e., 2-(o-chlorophenyl)-4,5-bis(m-methoxy-phenyl)-imidazole dimer; o-CI-HABI, i.e., 1,1'-Biimidazole, 2,2'-bis-(o-chlorophenyl)-4,4', 5,5'- tetraphenyl-; and TCTM-HABI, i.e., 1H-Imidazole, 2,5-bis(o-chlorophenyl)-4-3,4-dimethoxyphenyl-, dimer eac of which is typically used with a hydrogen donor, e.g., 2-mercaptobenzoxazole.

Preferred sensitizers include the following:
DBC, i.e., Cyclopentanone, 2,5-bis(diethylamino)-2-methylphenyl)methylene); DEAW, i.e., Cyclopentanone, 2,5-bis-((4-(diethylamino)phenyl)methylene); and Dimethoxy-JDI, i.e., 1H-Inden-1-one, 2,3-dihydro-5,6-dimethoxy-2-((2,3,6,7-tetrahydro1H,5H-benzo[i,j-]quinolizine-9-yl)-methylene).

The solid photopolymerizable compositions of this invention may contain a plasticizer. Plasticizers of this invention may be used in amounts varying from about 2% to about 20% by weight of the compositions preferably 5 to 15 wt. %.

Preferred plasticizers for use in simple cellulose acetate butyrate systems are triethyleneglycol dicaprylate, tetraethyleneglycol diheptanoate, diethyl adipate, Brij 30 and tris-(2-ethylhexyl)phosphate. Similarly, triethyleneglyco dicaprylate, diethyl adipate, Brij 30, and tris(2-ethylhexyl)- phosphate are preferred in "Monomer Oriented Systems" where cellulose acetate butyrate is the binder.

Other components in addition to those described above can be present in the photopolymerizable compositions in varying amounts. Such components include: ultraviolet radiation absorbing material, thermal stabilizers, hydrogen donors, oxygen scavengers and release agents.

Amounts of ingredients in the photopolymerizable compositions will generally be within the following percentage ranges based on total weight of the photopolymerizable layer: monomer, 5-50%, preferably 15-35%; initiator 0.1-10%, preferably 1-5%; binder, 25-75%, preferably 45-65%; plasticizer, 0-25%, preferably 5-15%; other ingredients 0-5%, preferably 1-4%.

The supports can be any substance transparent to actinic radiation that provides sufficient support to handle the combined base and layer. Preferably the support is transparent to light in the spectral region of 0.6 through 1.6 micrometers wavelengths. The term "support" is meant to include natural or synthetic supports, preferably one which is capable of existing in a flexible or rigid film or sheet form. For example, the support or substrate could be a sheet or film of synthetic organic resin, or a composite of two or more materials. Specific substrates include polyethylene terephthalate film, e.g., resin-subbed polyethylene terephthalate film, flame or electrostatic discharge treated polyethylene terephthalate film, glass, cellulose acetate film, and the like. The thickness of the supports has no particular importance so long as it adequately supports the film or layer removably adhered to it. A support thickness of about twenty-five(25) to fifty (50) micrometers using polyethylene terephthalate provide sufficient rigidity.

The following examples are provided as an illustration of how such a device may be made, but does not limit, the invention.

EXAMPLE 1

A substantially dry photohardenable (active) film (base or waveguide layer) of about 5.3 micrometers thick, having the ingredients listed in Table I, coated on a 25 micrometer thick clear polyethylene terephthalate support, in approximately a 3 inch×4 inch section, is exposed to broad band ultraviolet light in the spectral range of 350 to 400 nanometers through a conventional chrome-plated glass photo-mask to produce a 1×4 (one waveguide end to four waveguide ends or four to one) coupler waveguide pattern. After exposure and then an appropriate delay time of about 15 minutes, the mask is removed.

Next, a first substantially dry photohardenable layer (inner buffer layer) of about 30 micreometers thick, having the ingredients listed in Table II, coated on a 25 micrometers thick clear polyethylene terephthalate support, is laminated to the film surface over the waveguide.

Next, a second photohardenable layer (inner buffer layer) of identical composition and structure, as the first buffer layer, with support, is laminated to the opposite surface of the film (base or waveguide layer) and flooded as above. The laminate is subsequently flooded with broadband ultraviolet light in the spectral range on 350 to 400 nanometers.

In subsequent steps, the supports attached to the buffer layers are removed. Sequentially, a third and fourth buffer layer (outer buffer layers) of a composition as shown in Table III, and a structure as the other buffer layers are laminated to the first and second buffer layers, respectively, with flooding between each lamination and subsequent removal of the buffer layer support to form an optical waveguide device having a buried channel waveguide.

The resultant device is heated at 90° C. for 60 minutes to achieve thermal stability.

TABLE I

| BASE OR WAVEGUIDE LAYER | |
|---|---|
| INGREDIENT | WEIGHT % |
| Cellulose acetate butyrate[1] | 56.54 |
| Phenoxyethyl acrylate | 35.00 |

TABLE I-continued
BASE OR WAVEGUIDE LAYER

| INGREDIENT | WEIGHT % |
| --- | --- |
| Triethyleneglycol dicaprylate | 5.00 |
| o-Cl HABI[1] | 1.00 |
| 2-Mercaptobenzoxazole | 1.89 |
| Sensitizing dye (DEAW')[3] | 0.56 |
| 2,6-Di-t-butyl-4-methylphenol (BHT) | 0.01 |

[1]Eastman type CAB 531-1
[2]1,1'-bis-Biimidazole, 2,2'-bis-o-chlorophenyl-4,4',5,5'-tetraphenyl: CAS 1707-68-2
[3]2,5-Bis([4-diethylamino)-phenyl]methylene) cyclopentanone

TABLE II
INNER BUFFER LAYER

| INGREDIENT | WEIGHT % |
| --- | --- |
| Poly(vinylacetate), MW 500,000, CAS 9003-20-7 | 66.04 |
| Phenol ethoxylate monoacrylate, CAS 56641-05-5 | 17.02 |
| Ethoxylated bis-phenol A diacrylate, CAS 24447-78-7 | 3.00 |
| N-Vinyl carbazole | 7.94 |
| o-Cl-HABI[1] | 3.69 |
| 4-Methyl-rH-1,2,4-triazole-3-thiol, CAS 24854-43-1 | 2.09 |
| FC-430[2] | 0.19 |
| Sensitizing dye (DEAW')[3] | |

[1]1,1'-bis-Biimidazole, 2,2'-bis-o-chlorophenyl-4,4',5,5'- tetraphenyl: CAS 1707-68-2
[2]Fluoroaliphatic polymeric esters, 3M Company, St. Paul, MN
[3]2,5-Bis([4-(diethylamino)-phenyl]methylene) cyclopentanone

TABLE III
OUTER BUFFER LAYER

| INGREDIENT | WEIGHT % |
| --- | --- |
| Cellulose acetate butyrate[1] | 57.11 |
| Phenoxyethyl acrylate | 38.00 |
| o-Cl HABI[2] | 3.00 |
| 2-Mercaptobenzoxazole | 1.89 |

[1]Eastman type CAB 531-1
[2]1,1'-bis-Biimidazole, 2,2'-bis-o-chlorophenyl-4,4',5,5'-tetraphenyl: CAS 1707-68-2

EXAMPLE 2

The particular formulations described in Tables IV, V, and VI were used to create a single-mode guide operating at 1290 nanometer wavelength, as described in Example 1. The waveguide nominal dimension was 7.5±0.2 micrometers including both the mask dimension and the waveguide layer thickness. The inner and the outer buffer layers were approximately 28 micrometers each.

The general procedures for the waveguide device construction, which are given below, were employed:
(1) Standard exposure for creating a waveguide for single mode 1300 nanometer region operation for these materials (Table IV) was typically 18.5 millijoule exposure at 18° C. with a 5-minute wait for removal from the mask;
(2) lamination of inner buffer layers (Table V) using previously described procedures for removing Mylar[R] and placement of the second buffer layer waiting 30 minutes at 32° C. for inner buffer diffusion into and out of the waveguide layer;
(3) 2000 millijoule flooding exposure of both sides;
(4) addition of the outer buffer layer (Table VI) to each side with 15-minute diffusion and a flooding exposure at 5000 millijoules to both sides.

The total thickness of the sample was approximately 123 ±1 micrometers, with an embedded straight single-mode waveguide having dimensions 7.5 micrometers ±0.2 micrometer in both waveguide layer thickness and waveguide width. The guide operated single mode at 1300 nanometers with a typical loss of 0.4 to 0.5 dB/cm.

The sample was then ablated by an excimer laser for creation of an opening in the form of a slot 42, as illustrated in FIG. 13b.

The ablated opening was approximately 121±1 micrometers in width and 470 micrometers in length, with an insertion region having a depth of approximately 50 micrometers. This insertion region protects the opening from damage during microtoming, which is usually performed at a later stage.

The excimer laser wavelength was 248 nanometers. Using approximately 360 millijoules per pulse and a 10-hertz repetition rate, it took 30 seconds to create the individual slot.

After ablation, 8 layers of the composition shown in Table VII were laminated on each side of the sample as the outer package layers, thus forming a symmetrical opening having a square cross section in front of each end of the waveguide. After lamination, the front part of the laminate was microtomed to form a flat front side.

All materials had been baked at 95° C. for one hour before ablation. They were also baked under the same conditions after lamination of the packaging layers and before insertion of the optical fibers.

One optical fiber (AT&T 8.9-micrometer mode field and 8.3-micrometer core lightguide) having a nominal diameter of 125±1 micrometers was initially beveled in the front, and then coupled at each end of the waveguide. The beveled fiber had a taper disposed at approximately 30 degrees angle from the center axis of the fiber. The acrylate coating surrounding the fiber was stripped approximately 550 to 580 micrometers from the end of the cleaved optical fiber glass.

The coupling of the fiber to the device was conducted as follows:
(1) Each opening was filled with liquid adhesive photopolymer having the composition given in Table XIII with a small micro polyimide tube (from Polymicro Technologies Inc.),
(2) external heating was provided locally to rise the temperature to approximately 50° C. with a Peltier heating device,
(3) each optical fiber was inserted in to the respective opening, until it touched the waveguide, and then retracted to leave a distance of about 5 micrometers from the end of the waveguide,
(4) the heating was continued until the liquid adhesive photopolymer had diffused approximately 40 micrometers (one-third the optical fiber diameter), judging from differences in the refractive index, into the surrounding region; this also permits swelling of the layered structure of the device to press against the optical fiber as well as to ensure a smooth gradation of liquid adhesive photopolymer into the surround, and
(5) the liquid adhesive photopolymer was photocured or photohardened at room temperature by using a UV Teck Lite source under a nitrogen atmosphere followed by a 12-hour nitrogen atmosphere exposure in a fluorescent light box.

The angles between the center axes of the waveguide of the devise and the corresponding center axes of the fibers at each end of the waveguide were approximately 0.5 degrees.

The total loss of the fiber-to-waveguide-to-fiber configuration, described in this example, was 3.3 dB per total insertion with a calculated approximately 0.7 dB per optical fiber coupling. In this particular case, the double coupling (fiber to waveguide to fiber) provided reproducible, stable output when cycled over 45 to +85° C., at least five times. However, it displayed a throughput Fabry-Perot like optical oscillation, hypothesized to be due to opening up of the fiber-to-waveguide contact, and formation of a gap, as the temperature changes, since the device has an expansion coefficient approximately 100 times higher relative to that of the glass fiber. The thickness of the gap changes then with temperature, and affects the throughput according to the relation of the thickness of the gap with respect to the wavelength of the light trying to pass through. These repeatable temperature versus optical-throughput oscillations (as the temperature was changed, the optical throughput was decreasing and increasing repeatedly in an oscillationlike fashion) were about ±5% of the throughput. Back reflections into the optical system reinforce the hypothesis of a gap formation between the fiber and the waveguide of the device. The attempt, however, to explain the phenomenon of these oscillations by the hypothesis of the formation of a gap must not be construed as restrictive to the scope of the present invention.

In this example, the final refractive index for the adhesive photopolymer was approximately 1.52. Back reflections were approximately two and a half orders of magnitude down from the light input level during temperature monitoring, hypothesized as aforementioned to be due to formation of a small gap between fiber and waveguide.

EXAMPLE 3

A single optical fiber waveguide coupling was created with a substantially identical process and materials except for two "pockets", as indicated in FIG. 18, and an additional step of raising the temperature before and maintaining during photocuring at approximately 75° C. The photocuring at higher temperature substantially eliminated Fabry-Perot oscillations. Examination of the un-coupled end of the device, which communicated with the waveguide of the optical fiber, indicated excellent coupling without optical distortions. It is theorized, without intent to limit the scope of this invention, that when the photocuring is performed at higher temperatures, the fiber to the device bond remains under compression at lower temperatures, and no gap is formed between the front part of the fiber and the waveguide of the device, so that the Fabry-Perot oscillations are eliminated. The compression may be attributed to the differences of the thermal expansion coefficients of the photopolymers versus that of the glass fiber.

In this example, where high temperature curing of the adhesive photopolymer was used, back reflection was of the order $5 \times 10^{-4}$ and only varied (because of 0.06 refractive index difference) about $\pm 4 \times 10^{-4}$ from 85° C. to −45° C. due to bulk index reflective difference expected due to temperature change (i.e., $n/T = -3 \times 10^{-4}$).

For the following tables, the following definitions apply:

| | |
|---|---|
| o-Cl-HABI | 1,1′-biimidazole, 2,2′-bis[o-chlorophenyl]-4,4′,5,5′-tetraphenyl-; CAS 1707-68-2 |
| MMT | 4-methyl-4H-1,2,4-triazole-3-thiol; CAS 24854-43-1 |
| Photomer ® 4039 | phenol ethoxylate monoacrylate; CAS 56641-05-5; Henkel Process Chemical Company |
| Sartomer 349 | ethoxylated bisphenol A diacrylate; CAS 24447-78-7; Sartomer Company, West Chester, PA |
| CAB | cellulose acetate butyrate |
| DEAW | 2,5-bis([4-(diethylamino)-phenyl] methylene) cyclopentanone |
| TDMA | Triethylene glycoldimethacrylate |
| BHT | Butylated hydroxy toluene |
| Irgacure ® 651 | 2,2-dimethoxy-2-phenylacetophenone |
| Polyox ® WSR-3000 | Surfactant (Union Carbide Corp.) |
| Petrarch M8550 | Methacryloxypropyl trimethoxy silane |

TABLE IV

Waveguide Layer

| | % by wt. |
|---|---|
| Polyox WSRN-3000 | 1.00 |
| CAB 531-1 | 55.41 |
| Photomer 4039 | 34.94 |
| Sartomer 349 | 4.99 |
| MMT | 1.90 |
| o-Cl HABI | 1.00 |
| DEAW | 0.55 |
| BHT | 0.01 |
| 3 M FC-430 | 0.20 |

TABLE V

Inner Buffer Layer

| | % by wt. |
|---|---|
| Polyox WSRN-3000 | 0.97 |
| CAB 531-1 | 55.92 |
| Photomer 4039 | 23.45 |
| Sartomer 349 | 10.20 |
| o-Cl HABI | 0.97 |
| Ethyl Michler's Ketone | 0.49 |
| Benzophenone | 2.91 |
| TDMA | 5.10 |

TABLE VI

Outer Buffer Layer

| | % by wt. |
|---|---|
| CAB 381-20 | 45.50 |
| Photomer 4039 | 20.00 |
| Sartomer 349 | 8.50 |
| TDMA | 20.00 |
| MMT | 1.50 |
| o-Cl HABI | 1.00 |
| Ethyl Michler's Ketone | 0.48 |
| Benzophenone | 3.02 |

TABLE VII

Packaging Layer

| | % by wt. |
|---|---|
| CAB 381-20 | 47.50 |
| Photomer 4039 | 20.00 |
| Sartomer 349 | 8.50 |
| TDMA | 21.00 |
| Irgacure 651 | 3.00 |

TABLE VIII

Liquid adhesive photopolymer 1

| | % by wt. |
|---|---|
| TDMA | 73.5 |
| Photomer 4039 | 24.5 |
| Irgacure 651 | 2.0 |

TABLE IX

| Liquid adhesive photopolymer 2 | |
| --- | --- |
| | % by wt. |
| TDMA | 73.5 |
| Photomer 4039 | 12.5 |
| Irgacure 651 | 2.0 |
| Petrarch M 8550 | 12.0 |

Examples demonstrating the operation of the instant invention have been given for illustration purposes only, and should not be construed as restricting the scope or limits of this invention in any way.

What is claimed is:

1. A method of coupling an optical fiber having a first waveguide, a first end-point and a first center axis to an optical device having a second waveguide, a second end-point and a second center-axis, comprising the steps forming an opening of substantially square cross section, symmetrically in front of the second end-point in a direction substantially parallel to the direction of the second waveguide, the opening being adaptable to receive the optical fiber, introducing a liquid adhesive photopolymer in the opening;

inserting the fiber in the opening of the device so that the first and second end points are separated by a predetermined distance, and the first center axis substantially coincides with the second center axis;

raising the temperature to a predetermined point; and photocuring the liquid adhesive photopolymer at the raised temperature, with the requirement that the raised temperature is high enough as to reduce temperature versus optical-throughput oscillations of the device at temperatures lower than the predetermine point.

2. A method as defined in claim 1, wherein the step of introducing the liquid photopolymer in the opening is conducted before the step of inserting the fiber in the opening.

3. A method as defined in claim 1, wherein the step of introducing the liquid photopolymer in the opening is conducted after the step of inserting the fiber in the opening.

4. A method as defined in claim 1, further comprising the step of beveling the optical fiber before the step of inserting it in the opening.

5. A method as defined in claim 1, wherein the diameter of the optical fiber is substantially equal to the side of the square opening of the device.

6. A method as defined in claim 1, wherein the optical waveguide device comprises a laminate of middle photopolymer layers containing the waveguide, and of external packaging photopolymer layers.

7. A method as defined in claim 6, wherein the diameter of the optical fiber is adequately larger than the side of the square opening of the device, so that when the fiber and the optical waveguide device are coupled, self-centering of the first waveguide with the second waveguide is secured.

8. A method as defined in claim 7, wherein the raising of the temperature is conducted in two levels, a lower level adequate to prevent delamination of the layers during inserting the fiber into the opening, and a higher level adequate to reduce the temperature versus optical-throughput oscillations.

9. A method as defined in claim 1, wherein the photopolymer comprises a adhesion promoter.

10. A method as defined in claim 9, wherein the adhesion promoter is a silane.

11. A method as defined in claim 9, wherein the step of introducing the liquid photopolymer in the opening is conducted before the step of inserting the fiber in the opening.

12. A method as defined in claim 9, wherein the step of introducing the liquid photopolymer in the opening is conducted after the step of inserting the fiber in the opening.

13. A method as defined in claim 9, further comprising the step of beveling the optical fiber before the step of inserting it in the opening.

14. A method as defined in claim 9, wherein the diameter of the optical fiber is substantially equal to the side of the square opening of the device.

15. A method as defined in claim 9, wherein the optical waveguide device comprises a laminate of middle photopolymer layers containing the second waveguide, and of external packaging photopolymer layers.

16. A method as defined in claim 15, wherein the diameter of the optical fiber is adequately larger than the side of the square opening of the device, so that when the fiber and the optical waveguide device are coupled, self-centering of the first waveguide with the second waveguide is secured.

17. A method as defined in claim 16, wherein the raising of the temperature is conducted in two levels, a lower level adequate to prevent delamination of the layers during inserting the fiber into the opening, and a higher level adequate to reduce the temperature versus optical-throughput oscillations.

18. An article of manufacture comprising an optical fiber coupled with an optical waveguide device according to a method as defined in claim 9.

19. A method as defined in claim 1, further comprising the step of forming a pocket within the opening.

20. A method as defined in claim 19, wherein the step of introducing the liquid photopolymer in the opening is conducted through the pocket.

21. A method as defined in claim 19, wherein the step of introducing the liquid photopolymer in the opening is conducted before the step of inserting the fiber in the opening.

22. A method as defined in claim 19, wherein the step of introducing the liquid photopolymer in the opening is conducted after the step of inserting the fiber in the opening.

23. A method as defined in claim 19, further comprising the step of beveling the optical fiber before the step of inserting it in the opening.

24. A method as defined in claim 19, wherein the diameter of the optical fiber is substantially equal to the side of the square opening of the device.

25. A method as defined in claim 19, wherein the optical waveguide device comprises a laminate of middle photopolymer layers containing the second waveguide, and of external packaging photopolymer layers.

26. A method as defined in claim 25, wherein the diameter of the optical fiber is adequately larger than the side of the square opening of the device, so that when the fiber and the optical waveguide device are coupled, self-centering of the first waveguide with the second waveguide is secured.

27. A method as defined in claim 26, wherein the raising of the temperature is conducted in two levels, a lower level adequate to prevent delamination of the layers during inserting the fiber into the opening, and a higher level adequate to reduce the temperature versus optical-throughput oscillations.

28. An article of manufacture comprising an optical fiber coupled with an optical waveguide device according to a method as defined in claim 19.

29. An article of manufacture comprising an optical fiber coupled with an optical waveguide device according to a method as defined in claim 1.

* * * * *